Patented Aug. 2, 1949

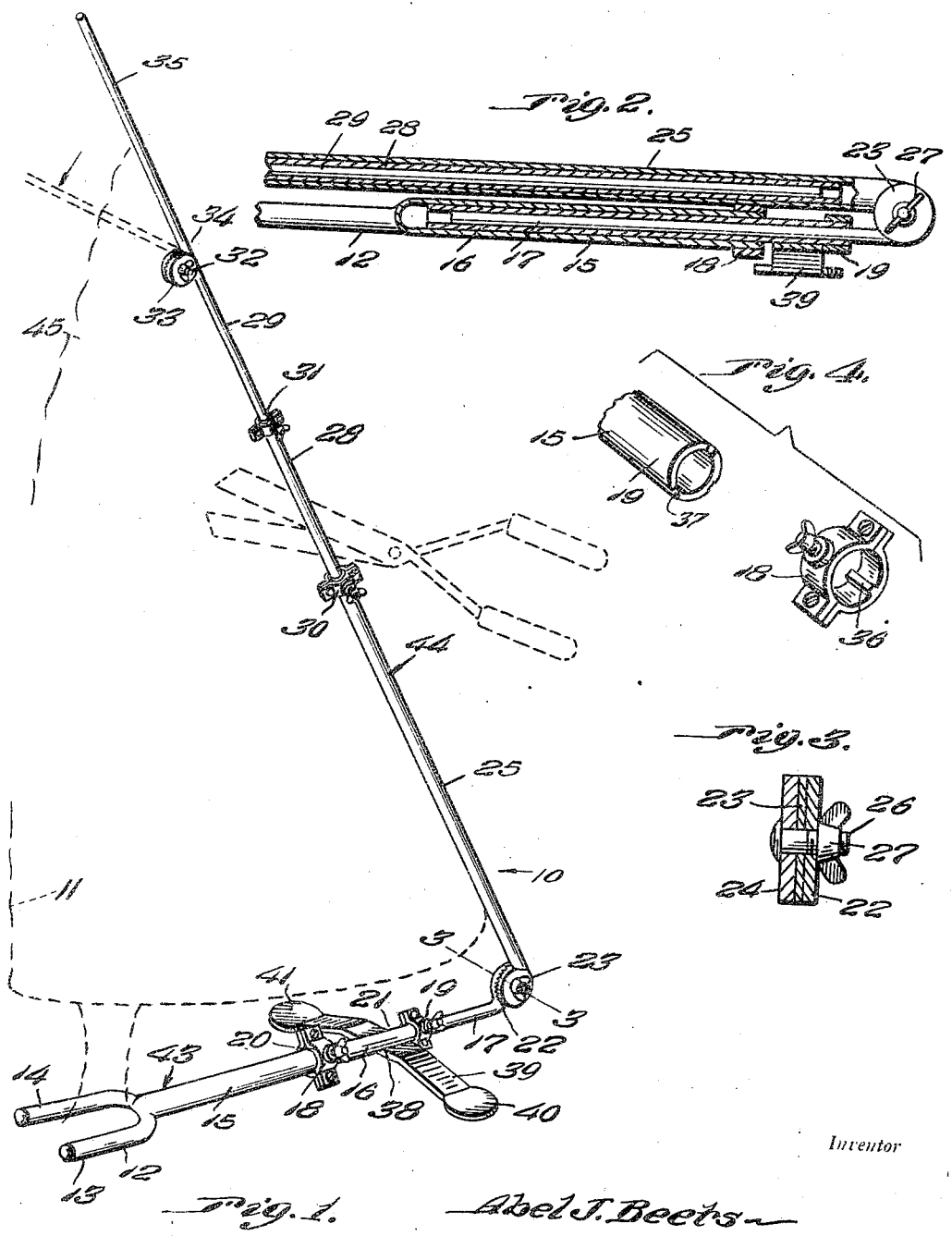

2,478,081

UNITED STATES PATENT OFFICE 2,478,081

TREE TRIMMING GAUGE

Abel J. Beets, Lansing, Mich.

Application January 14, 1946, Serial No. 641,127

6 Claims. (Cl. 33—174)

The invention as described herein, and illustrated in the accompanying drawings, consists of a gauge, an object of which is to provide means whereby a tree may be accurately and symmetrically trimmed.

Another object of the invention is to provide means whereby a tree may be trimmed uniformly entirely therearound in far less time than usually required for such work.

A still further object of the invention is the provision of means whereby both the diameter and pitch of a tree may be accurately gauged for trimming.

Other features and advantages will become more readily apparent from the following description and the accompanying illustrative drawings in which:

Figure 1 is a perspective view of the invention,

Figure 2 is a longitudinal sectional view of the device folded,

Figure 3 is a sectional view on line 3—3 of Figure 1, and

Figure 4 are detail views.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which 10 refers to the invention in its entirety and 11 indicates a tree (shown dotted) showing the application of the invention. The device consists of a fork 12, of a width that its furcations 13 and 14 will span a tree trunk. Integrally connected to the fork or U-member is a tubular shank 15 to which is telescopically connected a series of extension tubes 16 and 17 adapted to be secured in adjusted position by means of clamp collars 18 and 19 on the split ends 20 and 21 of the tubes 15 and 16.

The tube 17 has its flattened end 22 connected by a clamp hinge 23 to the like end 24 of a tube 25. The pintle nut 26 of the hinge 23 is provided on its threaded end 26 with a wing nut 27 whereby the members 17 and 25 may be secured in fixed adjusted relation.

To the member 25 is connected another series of telescopic extension tubes 28, 29, adjustably held by clamp collars 30 and 31.

To the terminal 32 of tube 29 is connected by a hinge 33 (a duplicate of hinge 23) the inner end 34 of a rod 35. The collar 18 is provided with an internal rib 36 adapted to enter a split 37 in the end 19 and be drawn against the surface 38 of the tube 16 to bind the tubes 15 and 16 together. The other joints are like formed. Welded to or otherwise fixed to tube 16 or 17 is a cross support 39 with terminal feet 40 and 41 by means of which together with the fork 12 will hold the device upright. It is obvious that a clamp collar (not shown) may be fixed to the center 42 of the support 39 whereby the support may be separated from the horizontal member 43 formed by the several tubes 15, 16 and 17 for adjustment thereon or for pivotal connection in order to align with the tubes when stored or packed for shipment.

In use, the fork is straddled upon a tree trunk, the horizontal member 43 adjusted to the lower diameter desired and the upright member 44 formed by the tubes 25 and 28 and rod 29 inclined to the pitch according to which it is desired to trim the tree 45 (as indicated in Figure 1) and the nut 27 tightened to hold the member 44 in raised adjusted position. Then the device is just kicked around the tree as the latter is trimmed, the member 44 being followed as the gauge. If it is desired to trim the top of the tree at a different angle from that of its side, the rod 35 is adjusted accordingly. When not in use the device may be folded as indicated in Figure 2.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described the invention that which is claimed to be new and desired to be procured by Letters Patent is:

1. The described tree trimming gauge consisting of a series of horizontal telescopic tubes and an upright gauge member connected thereto, means through which the gauge member may be moved in a true circle around the tree, means whereby the gauge member may be held in upright position, said upright gauge member being adjustable angularly and longitudinally, a series of telescopic tubes forming the gauge member, means for locking the tubes in adjusted position, and an upper angular gauging element on the gauge member.

2. A tree trimming gauge comprising a plurality of horizontally telescopic sections and a longitudinally adjustable upright gauge member pivotally mounted thereto, means for locking said gauge member at selected adjusted positions relative to said sections, said sections including an end section, and a bifurcated member carried by said end section for pivotally engaging a tree trunk.

3. A tree trimming gauge comprising a plurality of horizontally telescopic tubular sections and a longitudinally adjustable upright gauge member pivotally mounted thereto, means for preventing rotation of said sections relative to each other, means for locking said gauge member at selected adjusted positions relative to said sections, said sections including an end section, and a bifurcated member carried by said end section for pivotally engaging a tree trunk.

4. A tree trimming gauge comprising a plurality of horizontally telescopic tubular sections and a longitudinally adjustable upright gauge member pivotally mounted thereto, means for preventing rotation of said sections relative to each other, means for locking said gauge member at selected adjusted positions relative to said sections, said sections including an end section, a bifurcated member carried by said end section for pivotally engaging a tree trunk, an upper gauging element pivotally mounted on said gauge member, and means for locking said upper gauging element in selected adjusted positions relative to said gauge member.

5. The combination of claim 4 wherein said means for locking said gauging element relative to said gauge member includes a clamp hinge.

6. The combination of claim 4 wherein said means for preventing rotation of said telescopic tubular sections includes split clamps engaging the ends of adjacent sections, one of said sections having a longitudinal slot, and ribs carried by the inner periphery of said clamps engaging said slot, said rib also bearing against the inner telescoped section.

ABEL J. BEETS.

REFERENCES CITED

The following references are of record in the file of this patent:

UNITED STATES PATENTS

| Number | Name | Date |
|---|---|---|
| 432,578 | Stevens | July 22, 1890 |
| 2,095,059 | Donnelly | Oct. 5, 1937 |

FOREIGN PATENTS

| Number | Country | Date |
|---|---|---|
| 361,465 | Germany | July 10, 1921 |